United States Patent [19]

Wills

[11] 4,408,002
[45] Oct. 4, 1983

[54] STABILIZATION OF ZINC-CONTAINING COATING COMPOSITIONS

[75] Inventor: Paul E. Wills, Berwyn, Pa.

[73] Assignee: E. I. Du Pont de Nemours and Company, Wilmington, Del.

[21] Appl. No.: 373,704

[22] Filed: Apr. 30, 1982

Related U.S. Application Data

[63] Continuation of Ser. No. 220,996, Dec. 29, 1980, abandoned.

[51] Int. Cl.$^3$ .............................................. C08L 23/36
[52] U.S. Cl. ..................................................... 524/357
[58] Field of Search ......................................... 524/357

[56] References Cited

U.S. PATENT DOCUMENTS 4,168,249  9/1979  Meyer ................................... 260/16

FOREIGN PATENT DOCUMENTS 52-17933  9/1978  Japan .

OTHER PUBLICATIONS

Kansai Paint KK, 017933, 2/21/77–Japan (Abstract).

Primary Examiner—Stanford M. Levin
Attorney, Agent, or Firm—James H. Ryan

[57] ABSTRACT

The gelling of zinc-containing iminated acrylate coating compositions is prevented by including an effective chelating amount of 2,4-pentanedione in the composition.

4 Claims, No Drawings

STABILIZATION OF ZINC-CONTAINING COATING COMPOSITIONS

RELATED APPLICATION

This application is a continuation of my copending application Ser. No. 06/220,996, filed Dec. 29, 1980, and now abandoned.

BACKGROUND OF THE INVENTION

1. Field of the Invention

This invention relates to improvements in the stability of zinc-containing coating compositions having a film-forming material comprising an iminated acrylate interpolymer in an organic solvent.

2. Prior Art

Japanese Patent Application No. 52-17933, published Sept. 7, 1978, shows the use of certain diketones, including 2,4-pentanedione, to prevent the gelling of acrylate coating compositions contaminated with zinc.

Iminated acrylate polymers are well known in coating compositions as indicated, for example, by Meyer, U.S. Pat. No. 4,168,249 of Sept. 18, 1979.

Both the Japanese and the U.S. patents are incorporated herein by reference.

DESCRIPTION OF THE INVENTION

In the preparation of coating compositions containing an acrylate resin and a metallic compound in organic solvents, it is frequently found desirable to iminate the resin, e.g., as with propyleneimine, to improve the adhesion properties. When zinc is the metal employed, generally as the chromate but sometimes as the oxide, it is found that this iminated product is quite unstable. Frequently, it gels during the milling operation when the zinc compound is present. The chewing-gum consistency of the gel then stops the operation at this point. Even when an apparently satisfactory milling is accomplished, the product usually achieves an unusable viscosity or gels within a short time on aging.

In accordance with the present invention, it has been found that gelling can be prevented both during the milling operation and in the final product if a small amount of 2,4-pentanedione (acetyl acetone) is included in the solvent employed in the process for preparation of the coating composition. About 1–10% by weight, based on the weight of total finished product, is usable with about 1–5% being preferred. Normally, about 1.8% is employed. In any event, an amount effective to form a chelate with the zinc is needed. In addition, the dione may deactivate the iminated vehicle. Preferably, the dione is added to the process with the zinc compound, e.g., chromate, oxide, etc.

There follows an example, in which parts are by weight and temperatures in degree centigrade, illustrating the invention.

EXAMPLE

A. Preparation of Iminated Acrylic Resin

An iminated acrylic interpolymer is prepared as follows:

| Ingredient | Parts |
|---|---|
| Portion 1 | |
| Isopropanol | 110.83 |
| Toluene | 54.79 |
| Ethyl acetate | 148.05 |
| Methyl methacrylate (MMA) | 254.08 |
| Ethyl methacrylate (EMA) | 45.8 |
| Methacrylic acid (MAA) | 13.80 |
| Azobis(isobutyronitrile) | 0.73 |
| Portion 2 | |
| Ethyl acetate | 14.02 |
| Toluene | 18.40 |
| Azobis(isobutyronitrile) | 2.09 |
| Portion 3 | |
| Toluene | 7.18 |
| Portion 4 | |
| Isopropanol | 33.66 |
| Toluene | 97.37 |
| Portion 5 | |
| Propyleneimine (PIM) | 9.20 |

The ingredients of Portion 1 are added in order to a reactor equipped with an agitator. The batch is heated to 70°, the heat turned off, and unheated batch allowed to rise to reflux at 82°–85°. It is held at reflux for 45 minutes and premixed Portion 2 added in batches from a catalyst feed tank. Slight reflux is maintained for about 75 minutes. The catalyst feed tank is flushed into the reactor with Portion 3 and reflux (81°–83°) continued for 45 minutes. Portion 4 is added and the batch cooled to 55°. Portion 5 is added and the batch held for 2 hours without heat, the temperature, however, increasing slightly. At the end of an additional two hours, the batch is heated to 70°, held there for 1 hour, and cooled. The product is the iminated interpolymer MMA/EA/MAA/PIM in the ratio 81.0/14.6/4.4/2.91; Solids=38–40%.

B. Preparation of Zinc Dispersion

A zinc dispersion is made up as follows:

| Ingredient | Parts |
|---|---|
| Portion 1 | |
| Cellosolve TM acetate | 6.43 |
| Butyl benzyl phthalate | 4.72 |
| Butyl acetate | 14.41 |
| Isopropanol | 6.88 |
| Acetyl acetone | 3.82 |
| (about 1.9% of total finished product) | |
| Portion 2 | |
| Iminated resin from A | 22.53 |
| Portion 3 | |
| Bentonite thickener | 0.86 |
| Furnace black | 0.43 |
| Ti O$_2$ | 6.43 |
| Zinc chromate | 10.73 |
| Talc (low micron) | 22.76 |

The ingredients of Portion 1 are loaded into a conventional sand mill and mixed 15 minutes. Portion 2 is added and mixed for 15 minutes. The ingredients of Portion 3 are then added to the mill in order with the mixer running. Grinding is continued until a fineness of 0.5 mil is reached.

It should be noted that no gelling occurs during this preparation.

C. Coating Composition

| Ingredient | Parts |
|---|---|
| Dispersion from B | 452.76 |
| Iminated Resin from A | 335.19 |
| Benzyl butyl phthalate (plasticizer) | 19.39 |

-continued

| Ingredient | Parts |
|---|---|
| Acetone | 78.18 |
| Butyl acetate | 20.48 |

The above ingredients are added to a mixer in order and mixed for thirty minutes. The product is sprayed to 1.0 mil on sanded steel. The final ambient-air-cured coating is an excellent primer for conventional finishes, e.g., urethane, acrylics, etc. The product dispersion is also shelf stable at room and elevated temperatures indefinitely.

Having described my invention, I claim:

1. An iminated acrylate coating composition containing zinc which contains also an amount of acetyl acetone effective to chelate with the zinc and prevent gelation of the composition upon standing.

2. The coating composition of claim 1 wherein the acrylate is a copolymer of methacrylic acid.

3. In the preparation of an iminated acrylate coating composition containing zinc, the step of incorporating therein an amount of acetyl acetone effective to chelate with the zinc and to prevent gelation of the composition upon standing.

4. The preparation of claim 3 therein the acetyl acetone is incorporated along with the zinc.

* * * * *

UNITED STATES PATENT OFFICE
CERTIFICATE OF CORRECTION

PATENT NO. : 4,408,002
DATED : October 4, 1983
INVENTOR(S) : Paul E. Wills

It is certified that error appears in the above-identified patent and that said Letters Patent are hereby corrected as shown below:

Column 4, line 12, "therein" should read --wherein--.

Signed and Sealed this

Thirteenth Day of March 1984

[SEAL]

Attest:

Attesting Officer

GERALD J. MOSSINGHOFF

Commissioner of Patents and Trademarks